United States Patent [19]

Kawada et al.

[11] 3,970,991
[45] July 20, 1976

[54] CHARACTER RECOGNITION SYSTEM

[75] Inventors: Tsutomu Kawada, Yokohama; Kunio Sakai, Tokyo; Kenichi Mori, Yokohama, all of Japan

[73] Assignee: Tokyo Shibaura Electric Co., Ltd., Kawasaki, Japan

[22] Filed: Nov. 6, 1974

[21] Appl. No.: 521,449

[30] Foreign Application Priority Data
Nov. 8, 1973 Japan............................. 48-124956

[52] U.S. Cl. ................. 340/146.3 AC; 340/146.3 H
[51] Int. Cl.² .......................................... G06K 9/12
[58] Field of Search............ 340/146.3 J, 146.3 MA, 340/146.3 H, 146.3 D, 146.3 E, 146.3 AC, 146.3 AE

[56] References Cited
UNITED STATES PATENTS

| | | | |
|---|---|---|---|
| 3,613,080 | 10/1971 | Angeloni et al. | 340/146.3 MA |
| 3,613,081 | 10/1971 | Morimoto | 340/146.3 J |
| 3,717,848 | 2/1973 | Irvin et al. | 340/146.3 MA |
| 3,803,553 | 4/1974 | Nakano et al. | 340/146.3 D |
| 3,846,752 | 11/1974 | Nakano et al. | 340/146.3 H |
| 3,893,080 | 7/1975 | Ho et al. | 340/146.3 E |

*Primary Examiner*—Leo H. Boudreau
*Attorney, Agent, or Firm*—Cushman, Darby & Cushman

[57] ABSTRACT

A scanning device scans the entire surface of a character pattern, and a memory device stores therein the binary coded character pattern information obtained from the scanning device, and a peripheral pattern detector recognizes in turn the character pattern information of the memory device in the side direction of the character pattern to detect the outer contour of the kanji character of the character pattern, and in accordance with the information of said kanji character outer contour a peripheral pattern information pick-up circuit picks up the information items of four peripheral sides of the kanji character pattern. These information items are coded by a coding circuit and the information items thus coded are utilized for classifying kanji characters being recognized into large groups.

4 Claims, 15 Drawing Figures

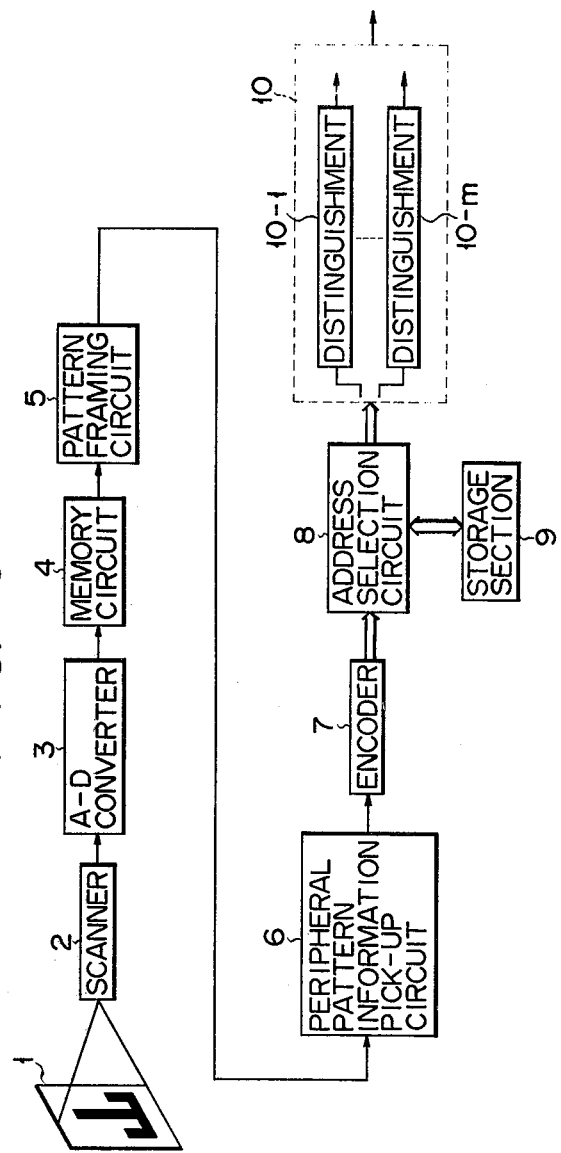
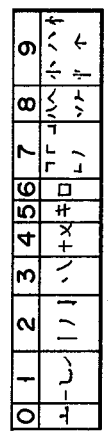

FIG. 4A
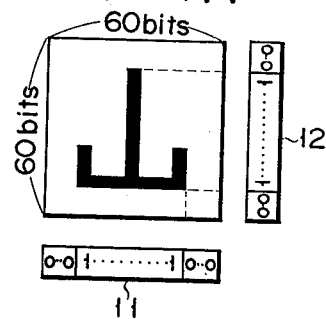
FIG. 4B
FIG. 7A  FIG. 7B  FIG. 7C
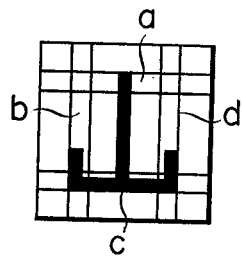 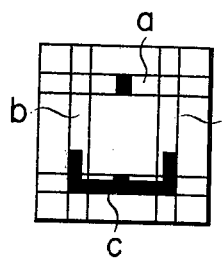 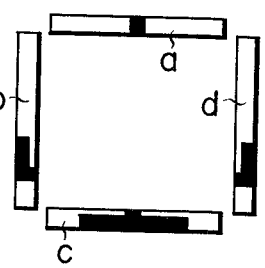
FIG. 8
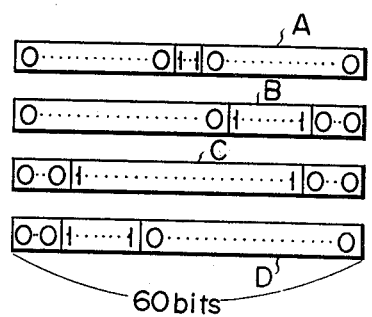

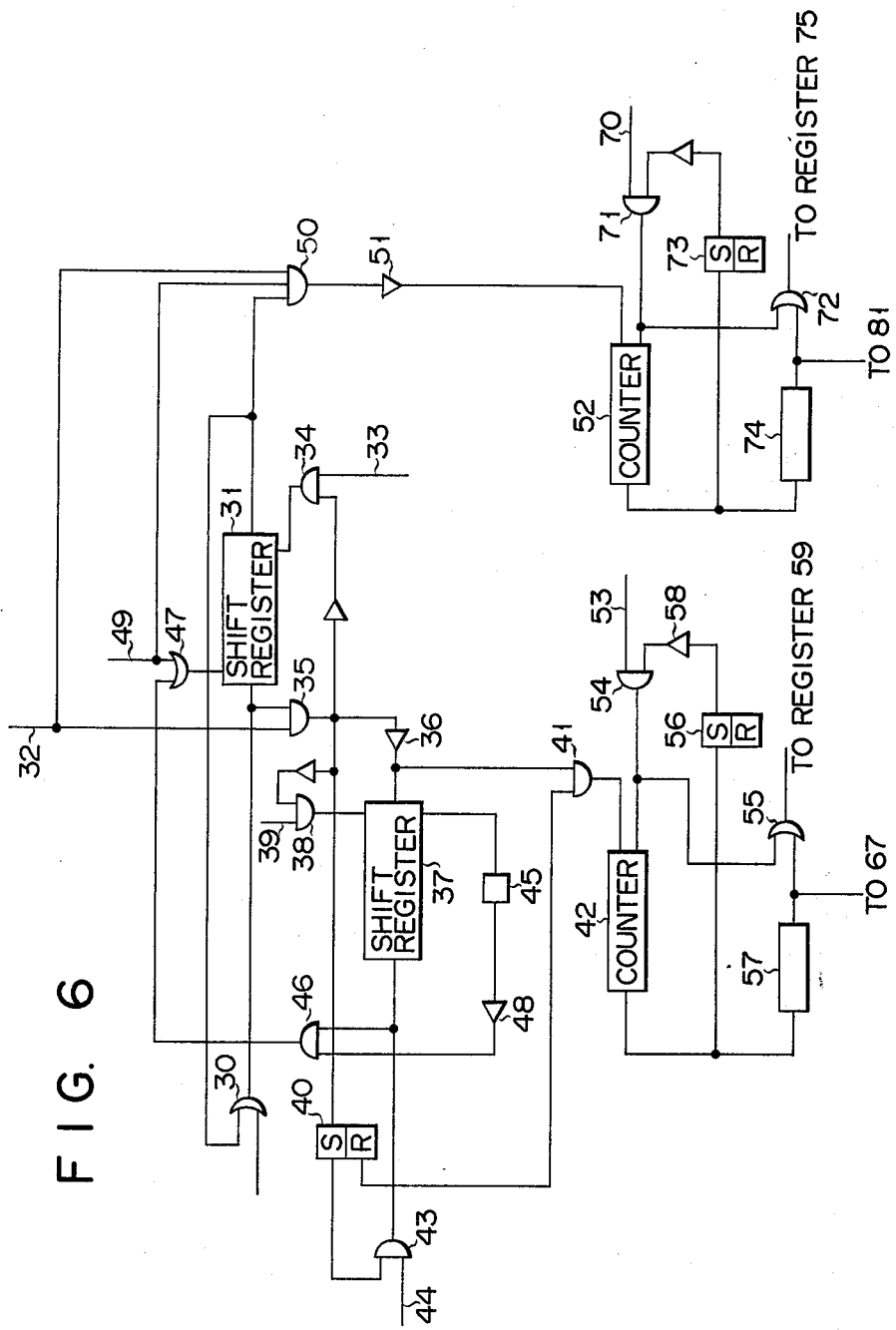
F I G. 6

F I G. 9
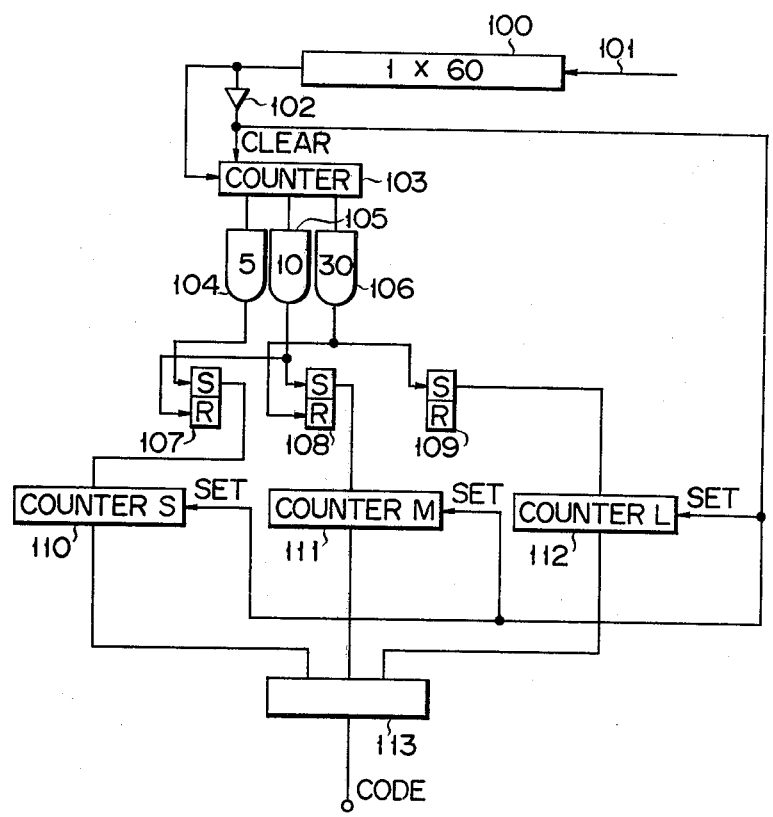

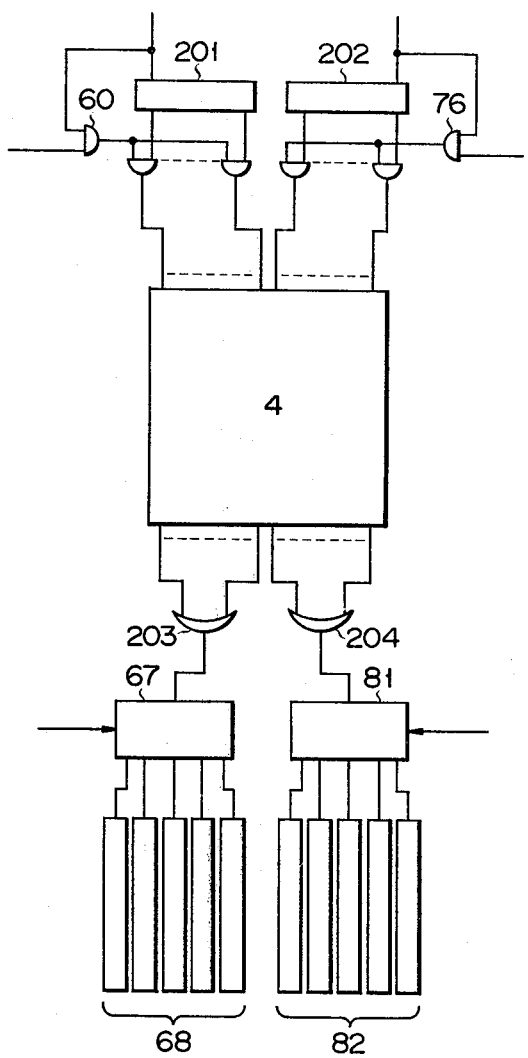

CHARACTER RECOGNITION SYSTEM

BACKGROUND OF THE INVENTION

This invention relates to a character recognition system, and more particularly to a character recognition system for classifying kanji characters into large groups utilizing the information of peripheral portions of each kanji character.

In Japan where a combined sentence of kanjis and hiraganas is used in everyday language, development of a kanji recognition apparatus is indispensable. Although, in the prior art, various types of devices are known as usable for the character read-out, the number of characters capable of being read out by such devices is on the order of 100 at most (digits, alphabetic characters or marks) and kanji character recognition is impossible. It is said that the difficulties of performing the kanji character recognition operation lie in the respects that a great number of different kanji characters as well as a number of kanji characters having a complicated pattern. It is considered, however, that if such kanji characters are able to be classified in some way or other into large groups, the above problem arising from the wide variety in kanji character type will be settled. However, the complicated pattern of kanji character is large in number and contains a lot of noise components. Accordingly, there arises the problem that the kanji character recognition operation is rendered disorderly due to such noises to render the classification operation difficult, and a satisfactory method has not yet been proposed which enables classification of kanji characters into large groups.

SUMMARY OF THE INVENTION

The object of the invention is to provide a character recognition system capable of classifying kanji characters into large groups in accordance with the information of the peripheral portions of a kanji character which have high stability to noises.

According to the invention, a character document having an actual character area including a character pattern to be recognized and a blank area surrounding the actual character area is scanned by a scanning device and is converted into binary coded character pattern information, and all of the character pattern information contents are stored in a memory device, and the character pattern information contents thus stored are read out and transferred to a peripheral pattern detector for detecting the outer contour of the kanji character of the character pattern being read out.

In accordance with the information of the kanji character outer contour from the peripheral pattern detector, the information items of peripheral portions of a kanji character pattern are picked up by a peripheral pattern information pick-up circuit, and the information items of four peripheral sides of the kanji character pattern as thus picked up are coded, and the information items thus coded are utilized for classification of kanji characters into large groups.

BRIEF DESCRIPTION OF THE DRAWING

FIGS. 2A and 2B are views respectively for explaining kanji character classification method called "Shikakugôma-hô";

FIG. 3 is a block circuit diagram showing a character recognition system acccording to an embodiment of the invention;

FIGS. 4A and 4B show a character pattern and a kanji character pattern, respectively;

FIGS. 5 and 6 are circuit diagrams respectively showing the character recognition system;

FIGS. 7A, 7B and 7C are character pattern views for explaining the peripheral pattern information pick-up operation;

FIG. 8 shows the respective information units as picked up, of kanji character peripheral portions;

FIG. 9 is a circuit diagram of a coding circuits; and

FIG. 10 is a circuit diagram showing part of a peripheral pattern information pick-up circuit according to another embodiment of the invention.

DETAILED DESCRIPTION OF THE PREFERRED EMBODIMENT

Figure 1A:
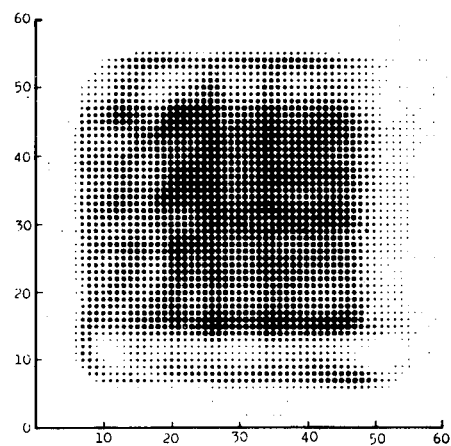
FIGS. 1A and 1B respectively show the condition of obscurity noise of a kanji character.
Figure 1B:
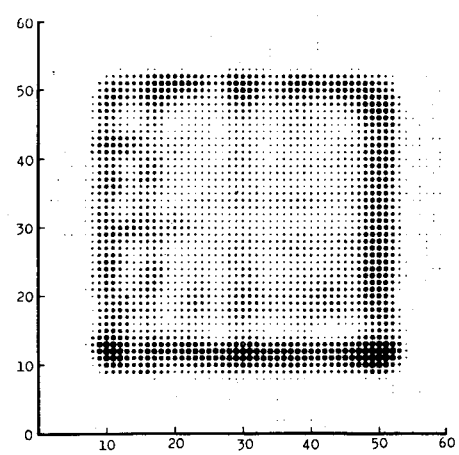

There will first be explained the noises of a kanji character pattern. One of the kanji pattern noises which is most influential upon the kanji recognition is a blurred noise produced due to a blurred pattern of kanji. In the case of a complicated kanji pattern, overlapping of the blurred noises causes entry of black parts into white spaces between the character lines constituting the kanji pattern, so that the character lines are extinguished, namely, a line deformation takes place. In view of the above, with respect to an overlapped 2035-kanji pattern unit, investigation was made of the portions easily influenced by the blurred noise and the portions difficultly influenced thereby, the results being presented in FIGS. 1A and 1B. In FIG. 1A, the portions deformed due to the blurred noise are indicated by black-coloured spots, the size of each black-coloured spot indicating the amount of character line deformation. As seen from FIG. 1A, the character line deformation due to the blurred noise becomes more prominent toward the central part of the overlapped kanji pattern unit and becomes less prominent toward the outer part thereof. FIG. 1A is a view illustrating how large an amount of information in discriminating kanji patterns by multiplying the complementary kanji pattern of FIG. 1A, (i.e., the pattern represented by the values obtained by subtracting the respective spot values of FIG. 1A from a specified value) by the respective spot entropy values of FIG. 1A each of such kanji patterns has. That is to say, the portions indicated by black-coloured spots of FIG. 1B are the kanji pattern portions having high stability to the blurred noise and having a large amount of information. From FIG. 1B it is seen that the kanji pattern portions having high stability to the blurred noise and having a large amount of information are concentrated at the outer part of the overlapped kanji pattern unit.

It is well known that a Kanji character has a divisionable structure, namely, one kanji character can be decomposed into a plurality of partial patterns and each of the partial patterns can further be decomposed into a plurality of combinations of character line elements. This means that the kanji character consists of finite number of character line element combinations. This will easily be understood also from the fact that a kanji dictionary clssifies kanji characters by "Tsukuri" or "Hen" ("Tsukuri" or "Hen" is a common component of kanji character). To perform the kanji classification utilizing the divisionable nature of a kanji character is advantageous in that the best use can be made of the structural nature inherent in the kanji character. The method of performing the kanji character classification by decomposing the above mentioned partial kanji pattern into character line element combinations includes a classification method called "Shikakugôma-hô", wherein the kanji classification is carried out by a code consisting of four digits. Namely, in this method, investigation is made of which of the classification sections each having different line elements or different line element combinations as shown in FIG. 2A the respective line elements or line element combinations at four corners of one kanji character belong to, thereby to conduct the kanji classification by a code based on the four digits corresponding to the thus selected sections.

FIG. 2B shows some of such examples. The classification numbers are each constituted by four digits obtained by taking out the four corners of one kanji character in the order of left-top, right-top, left-bottom and right-bottom. It is said that the number of those kanji characters of the kanji characters coded in accordance with said classification numbers which are capable of being expressed by ten different types of codes wherein the same code includes a plurality of different kanji characters accounts for 80% of a total number of over seven thousand and three hundred Chinese characters, and in the case of by 15 different types of codes, the number of the coded kanji characters expressable thereby accounts for 90% of said total number. In this manner, the "Skikakugôma-hô" is a kanji classification method which is carried out by combining and coding information items obtained where a kanji character pattern is viewed from the outer part toward the central part.

If information items are drawn out from the outer part of pattern of each kanji character used as Japanese and are coded for classification, utilizing the above-mentioned kanji pattern nature varying with the pattern noises and the above-mentioned "Shikakugôma-hô", the kanji pattern portions having high stability to the noises and having a large amount of information will be able to be drawn out as the information items.

There will now be described the present character recognition utilizing the foregoing principle by reference to FIG. 3 in which illustration is made in blocs.

A character document 1 on which a character pattern of, for example, a kanji" 山"is printed (which means "mountain" in English) is scanned by, for example, a flying spot scanner or television camera 2 and is converted into analogue signals corresponding to the density variation of the character pattern. The analogue signals thus converted are delivered to an A-D converter 3 and are converted there into a plurality of binary coded digit signals, and thereafter are stored in a memory circuit 4. It is to be noted that this embodiment will be explained on the assumption that the character pattern 1 has 60 × 60 bits and the memory circuit 4 having a memory capacity of 60 × 60 bits is constituted by shift registers.

When binary coded information derived from the entire surface of the character pattern 1 of 60 × 60 bits are stored in the memory circuit 4, framing of a kanji character pattern is effected by a pattern framing circuit 5. That is, by taking, as shown in FIG. 4A, the longitudinal and lateral projections of the character pattern the framing operation is performed to form such a kanji character pattern as shown in FIG. 4B.

When this framing operation is performed, the information items of four peripheral sides of the kanji character pattern of FIG. 4B are picked up by a peripheral pattern information pick-up circuit 6. Said information items are coded by a coding circuit 7, and the information thus coded is transferred to an address selection circuit 8, which selects in accordance with the coded information the address of a storage section 9 corresponding to said coded information and reads out one kanji information item group within the storage section corresponding to the selected address and transfers the item group to a distinguishment section 10. This distinguishment section 10 has a plurality of distinguishment circuits $10_1$ to $10_m$ each of which compares the respective items of the read-out kanji information item group with the input kanji information item "山". Thus is read out the kanji "山".

Figure 5:
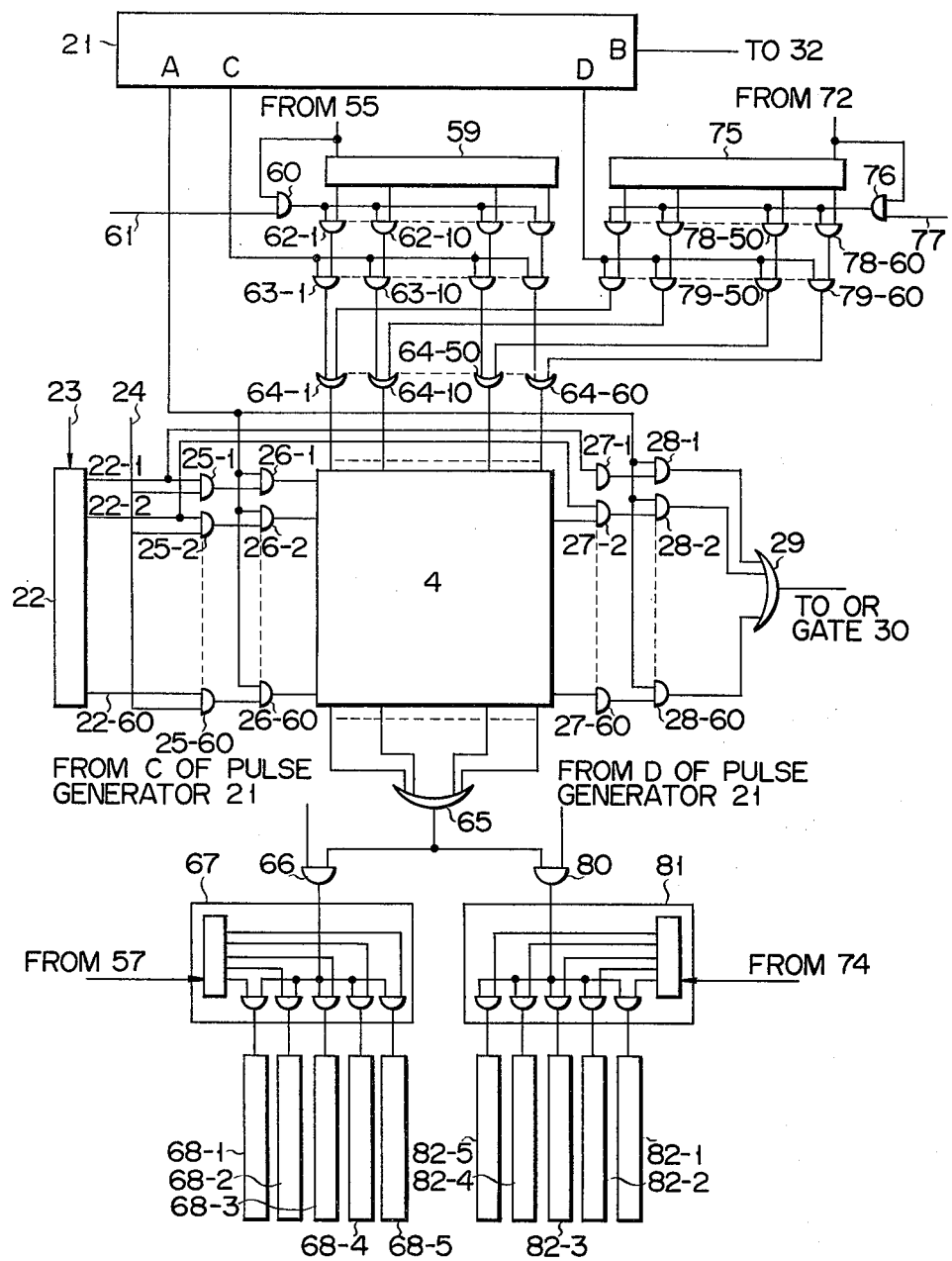

The foregoing kanji recognition, particularly the framing operation of the peripheral pattern detector or framing circuit 5 and the peripheral patten information pick-up operation of the peripheral pattern information pick-up circuit will now be more concretely explained by reference to FIGS. 5 and 6.

Let it be now assumed that all of the information items derived from the above mentioned kanji pattern "山"have been stored in the memory circuit 4 having a capacity of 60 × 60 bits. When a timing pulse generator 21 generates a pulse having a level of 1 from its output terminal A, AND gates 25-1 to 25-60 and AND gates 28-1 to 28-60 are opened.

Next, when a shift pulse is supplied through a line 23 to a shift register 22 having a capacity of 60 bits and the shift register makes the one-bit shift operation, a pulse having a level of 1 is generated from the first output terminal 22-1 of the shift register. When, under this condition, sixty clock pulses are supplied to a line 24, these are supplied through the AND gates 25-1 and 26-1 to a circulation type shift register partially constituting the memory circuit 4 and corresponding to the first one of the scanning lines. At this time, the stored contents of 60 bits of the first line shift register are read out and supplied to an OR gate 29 through the AND gates 27-1 and 28-1. The first line information read out through said OR gate 29 is supplied through an OR gate 30 shown in FIG. 6 to a shift register 31 having a capacity of 60 × 1 bits and stored therein. Next, when a second shift pulse is supplied through the line 23 and 60 clock pulses are supplied to the line 24, the stored contents of the second line shift register of the memory circuit 4 are read out and supplied to the shift register 31 through the AND gates 27-2 and 28-2 and the OR gates 29 and 30. At this time, the first line information previously stored is circulated through the OR gate 30 as the second line information is supplied in turn to the shift register 31. Accordingly, the first and second line information contents are stored in the shift register 31 in a logically summed state. When, in this manner, 60 shift pulses are supplied in turn to the shift register 22, and 60 clock pulses for each shift pulse are supplied to the line 24, the stored contents of 60-line shift registers of the memory circuit 4 are all read out and supplied to the shift register 31. When the stored contents of these 60-line shift registers have all been read out, the shift register 31 is stored with the information obtained by taking the logical sum of information items of the lateral lines of the kanji pattern "山", that is, the frame information of FIG. 4A. When, in this manner, the lateral frame of the kanji pattern "山" has been determined, the output level of the output terminal A of the timing pulse generator 21 is rendered zero to close the AND gates 26-1 and 28-1.

The logical sum of information items of the longitudinal lines of the kanji pattern "ム" is taken in the same manner as in the above lateral framing operation to obtain the frame information 12 of FIG. 4A. Thus is determined the longitudinal frame.

Next, the peripheral pattern information pick-up operation is carried out in accordance with the stored information of said shift register 31. In this case, as shown in FIGS. 7A and 7B, the kanji pattern portions each having a width extending by 5 bits from the respective sides of the actual kanji pattern area shown in FIG. 4B toward the center thereof are picked up as information items, and such for peripheral portions $a$, $b$, $c$ and $d$ as shown in FIG. 7C are formed. The reason why the width of the respective pattern portions as picked up is chosen to be 5 bits is that arrangement is intended to be so made that where the average kanji character line width is taken to be 4 bits, any character line portion can be included in said kanji pattern portion, i.e., included in said peripheral portion. Referring to FIG. 5, the timing pulse generator 21 supplies a signal having a level of 1 to a line 32 through an output terminal B. When up clock pulses are supplied through a line 33 to one of the input terminals of an AND gate 34 the shift register 31 makes the leftward shift-up operation because the outer input terminal of the AND gate 34 is in a state supplied with a 1 level signal. At this time, 0 level signals are produced in turn from the left end of the shift register 31 in accordance with the projection information 11 of FIG. 4A. These 0 outputs are supplied through an AND gate 35 to an inverter 36 and are converted there into 1 outputs, which are supplied to a 60 × 1-bit shift register 37 and are sequentially stored therein in response to the clock pulses which are being supplied through a line 39 to an AND gate 38. Further, the output signals from said inverter 36 are supplied to a counter 42 through an AND gate 41 supplied with reset signals from a flip-flop 40 to cause the counter 42 to make the count-up operation. When a 1 signal is produced from the left end of the shift register 31, the output level of the AND gate 35 is rendered 1, so that the output level of the inverter 36 is rendered 0. For this reason, the output levels of the AND gates 34 and 38 are rendered 0 to stop the shift-up operation of the shift registers 31 and 37. Simultaneously, since the output level of the AND gate 41 is rendered zero, the counter 42 ceases to make the count-up operation. The counter 42 at this time counts the number of 0's at the left end portion of the frame information 11 of FIG. 4A. Further, since, at this time, the flip-flop 40 is set by the 1 signal from the AND gate 35, an AND gate 43 is opened, so that the shift register 37 makes the rightward shift-down operation in response to the clock pulse from a line 44. Accordingly, at this time, a 1 signal is produced from the right end of the shift register 37, and this 1 signal is supplied to a 0 detector 45 only. Further, the output from the AND gate 43 synchronized with said clock pulse is supplied to the shift register 31 through opened AND gate 46 and OR gate 47 to cause the shift register 31 to make the shift-down operation. When a 0 signal appears at the right end of the shift register 37, the 0 detector 45 produces a 1 signal. The 1 output signal from the detector 45 is converted by an inverter 48 into a 0 signal to close the AND gate 46. As the result, the shift register 31 ceases to make the shift-down operation. At this time, the shift register 31 is brought back to the original state.

Next, when down clock pulses are supplied to a line 49, these cause the shift register 31 to make the rightward shift-down operation through the OR gate 47. The 0 signals produced at this time from the right end of the shift register 31 are supplied to a counter 52 through an AND gate 50 and inverter 51 to cause this counter to make the count-up operation. When a 1 signal appears at the right end of the shift register 31, the counter 52 ceases to make the count-up operation. At this time, the counter 52 counts the number of 0's at the right end portion of the frame information 11 of FIG. 4A.

Next, the timing pulse generator 21 generates a pulse having a level of 1 from its output terminal C. When, under this condition, a clock pulse is supplied through a line 53 to an AND gate 54, the counter 42 is caused to make the count-down operation and simultaneously a pulse signal as the shift pulse is supplied through an OR gate 55 to a shift register 59 thereby to cause the shift register 59 to make the rightward shift-down operation. When the counter 42 counts down the number of its counts, i.e., the number of 0's at the left end portion of the frame information 11, it produces a 1 level output, which sets a flip-flop 56 and simultaneously is supplied to a 5-pulse generator 57. The set output, i.e., 1 level output of the flip-flop 56 is converted by an inverter 58 into a 0 output, which closes the AND gate 54. At this point of time, the shift register 59 is in a state having performed the rightward shift operation by the number of counts equal to the number of 0's at the left end of the frame information 11. The 5-pulse generator 57 supplied with the 1 level output from said counter 42 generates five pulses, which are supplied to the shift register 59 through the OR gate 55 thereby causing this shift register to further make the rightward shift operation. In this case, the output delivered through the OR gate from the pulse generator 57 opens an AND gate 60 to permit 60 pulses generated for each pulse from the pulse generator 57 to be supplied through a line 62 to the inputs at one side of an AND gate group 62. Accordingly, for example, an AND gate 62-10 opened by the output pulse produced, when the shift register 59 has been supplied with the output from the pulse generator 57, from one output terminal of the shift register 59 generates 60 output pulses. The output pulse from the AND gate 62-10 is supplied through an AND gate 63-10 and OR gate 64-10 to the tenth column circulation type shift register of the memory circuit 4 from the left side thereof to read out contents of this shift register in a longitudinal direction. The information contents thus read out are supplied to a digit selection circuit 67 through an OR gate 65 and AND gate 66. The stored information of said tenth column shift register is introduced by the digit selection circuit 67 into a register 68-1 having a capacity of 60 × 1 bits and is stored therein. In this way, in response to five output pulses from the pulse generator 57 the respective stored information items of five-column shift registers of the memory circuit 4 are read out, and the information items thus read out are stored sequentially in the registers 68-1 to 68-5, respectively. When the stored information items of these registers are combined, the previously mentioned peripheral portion $b$ of FIG. 7C is obtained.

Next, the timing pulse generator 21 generates an output having a level of 0 from its output terminal C and an output having a level of 1 from its output terminal D. When, under this condition, a clock pulse is supplied through a line 70 to an AND gate 71, the counter 52 is caused to make the count-down operation and simultaneously a shift register 75 is caused to make the leftward shift operation by a shift pulse supplied through an OR gate 72. When the counter 52 has made the count-down operation by the number of counts equal to that of 0's at the right end portion of the frame information 11, an output pulse having a level of 1 appears at the output terminal of this counter. This output pulse sets a flip-flop 73 and simultaneously is applied to a 5-pulse generator 74. Therefore, the generator 74 generates five output pulses, which are supplied to a shift register 75 and to an AND gate 76 whose one side input terminal is supplied with clock pulses through a line 77. For example, an AND gate 78-50 supplied with the output pulses from the shift register 75 and the output pulses from the AND gate 76 generates 60 output pulses, which are supplied to the memory circuit 4 through an AND gate 79-50 and OR gate 64-50 to read out the stored information of the memory circuit. The stored information thus read out is supplied through the OR gate 65 and AND gate 80 to a digit selection circuit 81. The read out information is introduced by the digit selection circuit 81 into a register 82-1 having a capacity of 60 × 1 bits and is stored therein. In this way, in response to five output pulses form the pulse generator 74 the respective stored information items of five-column shift registers of the memory circuit 4 are stored in the registers 82-1 to 82-5, respectively. When the stored contents of these registers are combined, the previously mentioned peripheral portion d of FIG. 7C is obtained. In the same manner as above mentioned the pattern information pick-up operation is laterally carried out using similar circuits thereby to obtain the peripheral portions a and c. The four peripheral portions a, b, c and d thus obtained are converted into four one-dimensional data rows or data units A, B, C and D each including a continuous digit 1 train as shown in FIG. 8 by logically summing the information items stored in the five column shift registers corresponding to each of said four peripheral portions a, b, c and d. That is, the data unit B is obtained from the logical summing of the stored contents of the registers 68-1 to 68-5 while the data unit D is obtained from the logical summing of the stored contents of the registers 82-1 to 82-5.

The data units A, B, C and D thus obtained are delivered to the coding circuit 7 of FIG. 3. In the coding circuit 7, the items of the data units A, B, C and D are coded in a state classified in accordance with the bit number of consecutive 1's into three groups of long data (long continuous digit signal train) L, middle data (middle continuous digit signal train) M and short data (short continuous digit signal train) S. The length of data item varies depending upon the character size and character line thickness of a Kanji as read out but in this embodiment said L, M and S are previously determined to range between 30 and 60 bits, between 10 and 29 bits, and between 5 and 9 bits, respectively.

FIG. 9 is a circuit diagram of the coding circuit 7. Explanation will be made by taking as an example the data unit A of the above described data rows A, B, C and D. The data unit A of 1 × 60 bits is stored in a shift register 100, which is caused to make the shift operation by a clock pulse 101, and the output from the shift register 100 is supplied to an inverter 102 and counter 103. When it is assumed that five to nine 1 digits are consecutively introduced into the counter 103, a 5-bit decoder 104 is operated to generate a pulse thereby setting a flip-flop 107. The flip-flop 107 supplies a pulse to an S counter 110 for counting the number of data items S to cause the counter 110 to make the count-up operation. Where 10 to 29 1 digits are consecutively introduced into the counter 103, a 10-bit decoder 105 is operated to generate a pulse, which sets a flip-flop 108 to cause an M counter 111 for counting the number of data items M to make the count-up operation and simultaneously resets a flip-flop 107. Accordingly, where ten to twenty nine 1 digits are consecutively introduced, the M counter 111 alone is caused to make the count-up operation. Similarly, where 30 or more (from 30 to 60) 1 digits are consecutively introduced into the counter 103, a 30-bit decoder 106 is operated to produce an output, which sets a flip-flop 109 and simultaneously resets the flip-flop 108. In this case, accordingly, an L counter 112 for counting the number of long data L is only caused to make the count-up operation.

Consideration will now be given to the case where, for example, five 1 digits are consecutively introduced into the counter 103, and subsequently several 0 digits are consecutively introduced thereinto, and subsequently 15 1 digits are again consecutively introduced thereinto. First, by the initial five consecutive 1 digits the decoder 104 is operated to generate a pulse thereby causing the S counter 110 to make the count-up operation by one. Next, the 0 digit is supplied to the counter 103, but this 0 digit is converted beforehand by said inverter 102 into a 1 digit to clear the contents of the counter 103. Any of the succeeding 0 digits clears the content of the counter 103 thereby preventing the counter 103 from making the count-up operation. When entry of said several consecutive 0 digits into the counter 103 is completed and subsequently the 1 digit is entered into the counter 103, the content of the counter 103 ceases to be cleared, so that the counter 103 starts to make counts by the number of 1 digits. Since the number of 1 digits is 15 and these are consecutively supplied to the counter 103, the decoder 105 is operated, in the same manner as previously mentioned, to generate a pulse, thereby causing the M counter 111 to make the count-up operation by one.

The same explanation applies also to the data units B, C and D, and by the number of consecutive 1 digits of each unit the counting operation is performed.

When, in this manner, the respective numbers of data L, M and S are determined for each data unit, these are delivered into a decoder 113 and are coded there. Where coding is effected, it is desirable that respective codes have substantially the same number of kanji characters. Accordingly, with respect to each of the 2035 kanji characters, determination was made of the respective numbers of L, M and S, thereby to determine the number of kanji characters corresponding to each L-M-S combination, the results being presented in Table 1. And with respect of said respective combinations, code determination was made so as to permit said respective codes to have substantially the same number of kanji characters. In this embodiment, as shown at the extreme right of Table 1, said combinations were classified into 10 stages from the code 0 to the code 9. Although, in this embodiment, the 20 L-M-S combinations are classified into codes of 10 different types from the code 0 to the code 9 so as to average the kanji character numbers corresponding to the respective codes, such codes may of course be increased in number so that the number of kanji characters included in each code can be decreased.

TABLE 1

| L | M | S | A | B | C | D | Code |
|---|---|---|-----|-----|-----|-----|------|
| 0 | 0 | 1 | 234 | 206 | 64  | 205 | 0 |
| 0 | 0 | 2 | 333 | 407 | 76  | 375 | 1 |
| 0 | 0 | 3 | 153 | 327 | 50  | 287 | 2 |
| 0 | 0 | 4 | 21  | 88  | 37  | 115 | 2 |
| 0 | 0 | 5 | 4   | 9   | 5   | 18  | 2 |
| 0 | 0 | 6 | 0   | 0   | 0   | 4   | 2 |
| 0 | 0 | 7 | 0   | 0   | 0   | 1   | 2 |
| 0 | 1 | 0 | 75  | 159 | 119 | 116 | 3 |
| 0 | 1 | 1 | 413 | 202 | 315 | 249 | 4 |
| 0 | 1 | 2 | 110 | 248 | 252 | 204 | 5 |
| 0 | 1 | 3 | 16  | 31  | 76  | 66  | 5 |
| 0 | 1 | 4 | 0   | 61  | 2   | 8   | 5 |
| 0 | 2 | 0 | 188 | 33  | 319 | 88  | 6 |
| 0 | 2 | 1 | 23  | 22  | 231 | 67  | 7 |
| 0 | 2 | 2 | 0   | 9   | 28  | 12  | 7 |
| 0 | 2 | 3 | 0   | 0   | 1   | 0   | 7 |
| 0 | 3 | 0 | 1   | 0   | 41  | 6   | 7 |
| 0 | 3 | 1 | 0   | 0   | 1   | 0   | 7 |
| 1 | 0 | 0 | 402 | 180 | 245 | 175 | 8 |
| 1 | 0 | 1 | 51  | 45  | 156 | 35  | 9 |
| 1 | 0 | 2 | 1   | 0   | 1   | 0   | 9 |
| 1 | 1 | 0 | 10  | 8   | 16  | 4   | 9 |

Table 2 shows the kanji character numbers corresponding for each kanji character peripheral side to the respective codes.

TABLE 2

| Code<br>Side | 0 | 1 | 2 | 3 | 4 | 5 | 6 | 7 | 8 | 9 |
|------|-----|------|------|-----|------|------|-----|-----|------|-----|
| A    | 234 | 333  | 178  | 75  | 413  | 126  | 188 | 24  | 402  | 62  |
| B    | 206 | 407  | 424  | 159 | 202  | 340  | 33  | 32  | 180  | 53  |
| C    | 64  | 76   | 92   | 119 | 315  | 330  | 319 | 302 | 245  | 173 |
| D    | 205 | 375  | 425  | 116 | 249  | 278  | 88  | 85  | 175  | 39  |
| TOTAL| 709 | 1191 | 1119 | 469 | 1179 | 1074 | 628 | 443 | 1002 | 327 |

After, in this manner, code determination has been made by the coding circuit 7, respective code signals are delivered to the address selection circuit 8.

The address selection circuit 8, as first mentioned, selects in accordance with that combination code obtained from combination of the respective codes of A, B, C and D which is supplied from the coding circuit 7, that address within the storage section 9 corresponding to said combination code, and supplies to the distinguishment section 10 the kanji character group stored in said address.

In the distinguishment section 10, as first mentioned, comparison of the kanji characters of said group with the kanji characters as stored is effected, and reading of kanji characters having coincidence with each other is performed.

As above described, according to the invention, the information of the peripheral portions of a kanji character pattern is picked up, and in accordance with said information kanji characters being read out are classified into large groups, from each of which such kanji characters are read out. If the kanji character reading operation is performed in the above mentioned manner, a reliable and stable kanji character reading operation will be carried out in a manner little affected by the noise component of a kanji character pattern.

The foregoing embodiment referred to the case where the peripheral pattern information pick-up circuit is based on the utilization of the shift registers 59 and 75 respectively having a capacity of 60 bits, but as another embodiment arrangement may be so made that as shown in FIG. 10 use is made of shift registers 201 and 202 respectively having a capacity of 30 bits, each of said shift registers taking charge of the half of the memory device 4. In this case, the information read out from the memory device 4 is delivered to the digit selection circuits 67 and 81, respectively, through OR gates 203 and 204 provided correspondingly to the shift registers 201 and 202, respectively. If construction is made as such, the peripheral pattern information pick-up operation will be able to be carried out by operating said shift registers 201 and 202 reciprocally or by operating both at the same time, and further circuit construction will be rendered considerably simple.

What we claim is:

1. A character recognition system for recognizing a character pattern on a character document having an actual character area including four peripheral sections corresponding to the respective four sides of the character pattern including character line portions and a blank area surrounding the actual character area comprising:

scanning means for scanning the character documents to generate character pattern analogue signals;

binary coding means for converting the character pattern signals from the scanning means into a plurality of character pattern digital signals including digital signals constituting four peripheral information units corresponding to the four peripheral sections, each of the four peripheral information units including at least one continuous digital signal train corresponding to the length of the character line portion;

memory means for storing the character pattern binary coded digital signals obtained from the binary coding means;

pattern framing means for framing the actual character area of the character document on the basis of the character pattern binary coded digital signals stored in the memory means;

peripheral pattern information unit pick-up means for reading out from the memory means the four peripheral information units in accordance with the framing data from the character pattern framing means;

length information detecting means for detecting the continuous digital signal train included in each of the four peripheral information units to code the digital signal train into a length information code;

a storage section for storing a plurality of character groups each including a plurality of different characters;

an address selection circuit addressing a corresponding character group to the character being recognized from the storage section in accordance with the four length information codes corresponding to the four peripheral information units; and recognizing means for recognizing the character being recognized from a plurality of different characters included in the detected character groups.

2. A character recognition system according to claim 1, wherein the character pattern framing means comprises means for reading out all the character pattern binary digital signals stored in the memory means; means for adding the character pattern binary digital signal supplied successively from the memory means by the reading out means; and means for detecting the front and rear digital signals of the added binary digital signals to generate the framing signal.

3. A character recognition system according to claim 1, wherein the peripheral information unit pick-up means comprises a actual character area edge addressing means for determining the address of the memory means corresponding to the edge of the actual character area on the basis of the framing signal from the character pattern framing means; a pulse generating means for generating a predetermined number of pulses in response to the framing signal; a peripheral information read-out means for reading out the character pattern binary digit signals corresponding to the address numbers equal to the pulse numbers of the pulses from the pulse generating means in response to the pulses; and adding means for adding the character pattern binary digital signals read out by the peripheral information read out means to detect the peripheral information unit.

4. A character recognition system according to claim 1, wherein said length information detecting means includes a counter for counting the continuous binary coded digital signals included in the respective four peripheral pattern information units obtained from said peripheral pattern information pick-up means to obtain the continuous digital signal trains which correspond to the lengths of the character line portions; an information length classification unit for classifying the continuous digital signal trains into three groups of long information, middle information and short information signal trains in accordance with the count number of said counter, a long information counter for counting the number of said long information trains, a middle information counter for counting the number of said middle information trains, and a short information counter for counting the number of said short information trains.

* * * * *